(12) United States Patent
Filiberti et al.

(10) Patent No.: US 6,176,774 B1
(45) Date of Patent: *Jan. 23, 2001

(54) COIN HOPPER WEIGHING SYSTEM

(75) Inventors: Peter Filiberti, Las Vegas; Gary L. Coulter; Judith Karabin, both of Henderson, all of NV (US)

(73) Assignee: Spinteknology, Inc., Las Vegas, NV (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/900,554

(22) Filed: Jul. 25, 1997

Related U.S. Application Data

(63) Continuation-in-part of application No. 08/586,513, filed on Jan. 16, 1996, now Pat. No. 5,819,901, which is a continuation-in-part of application No. 08/414,238, filed on Mar. 31, 1995.
(60) Provisional application No. 60/005,312, filed on Oct. 16, 1995.

(51) Int. Cl.[7] .............................. G07D 1/00; G01G 19/00
(52) U.S. Cl. .............................................. 453/32; 177/245
(58) Field of Search .................................. 177/229, 262, 177/245; 453/32

(56) References Cited

U.S. PATENT DOCUMENTS

| | | |
|---|---|---|
| 3,789,202 | 1/1974 | Yamanaka . |
| 3,795,252 * | 3/1974 | Black ...................................... 453/32 |
| 3,917,981 * | 11/1975 | Keen .................................... 177/245 |
| 4,219,089 | 8/1980 | Gard et al. . |
| 4,238,127 | 12/1980 | Lucero et al. . |

(List continued on next page.)

FOREIGN PATENT DOCUMENTS

| | | |
|---|---|---|
| 39 02 085 A1 | 7/1990 | (DE) . |
| 41 40 451 A1 | 6/1993 | (DE) . |
| 2 221 315 | 1/1990 | (GB) . |
| 2 272 383 | 5/1994 | (GB) . |
| WO 98/12515 | 3/1998 | (WO) . |

OTHER PUBLICATIONS

W.W. Grainger, Inc. Catalog, pp. 893.
"Intelligent DPM Provides PC Software," *Electronic Products*, Jan. 1986, pp. 112.

(List continued on next page.)

*Primary Examiner*—Robert P. Olszewski
*Assistant Examiner*—Bryan Jaketic
(74) *Attorney, Agent, or Firm*—Townsend and Townsend and Crew LLP; Guy W. Chambers; Kevin LeMond

(57) ABSTRACT

An apparatus and method are provided for deterring gaming machine theft and fraud by weighing the number of coins accumulated in a gaming machine hopper assembly (9). In one preferred embodiment, a coin weighing apparatus (12) consisting of a load cell (13) and internal strain gauge (18) is constructed integrally with the coin hopper assembly and fits between the coin hopper (10) and its base plate (14). In other preferred embodiments, the coin weighing apparatus (22, 43, 50) is constructed separately from the coin hopper assembly. In these other preferred embodiments, the weighing apparatus includes upper (24, 46, 52) and lower plates (26, 48, 60) which are separated by one or more load cell weighing instruments (28, 45, 56). In operation, the lower plate of this stand-alone weighing apparatus is typically placed against the bottom (8) of the slot machine and the hopper is then simply placed on top of the weighing apparatus' upper plate. The present invention also provides a method of detecting fraud or theft using the weighing apparatus of the present invention to take periodic readings of the number of coins residing in the hopper and communicating those reading as appropriate.

38 Claims, 12 Drawing Sheets

U.S. PATENT DOCUMENTS

| | | |
|---|---|---|
| 4,283,709 | 8/1981 | Lucero et al. . |
| 4,382,527 | 5/1983 | Lerner . |
| 4,447,885 | 5/1984 | Biss . |
| 4,512,428 | 4/1985 | Bullivant . |
| 4,522,275 | 6/1985 | Anderson . |
| 4,646,767 | 3/1987 | Hikita . |
| 4,795,155 | 1/1989 | Grande . |
| 4,881,606 * | 11/1989 | Halfon et al. .................. 177/245 |
| 5,046,989 | 9/1991 | Dass . |
| 5,056,643 | 10/1991 | Kirberg . |
| 5,119,894 * | 6/1992 | Crawford et al. ............ 177/229 |
| 5,123,494 | 6/1992 | Schneider . |
| 5,193,629 | 3/1993 | Lare . |
| 5,199,517 | 4/1993 | Kirby . |
| 5,429,361 | 7/1995 | Raven et al. . |
| 5,477,952 | 12/1995 | Castellano et al. . |
| 5,531,309 | 7/1996 | Kloss et al. . |

OTHER PUBLICATIONS

"Acquisition Module Links to Serial Port," *Electronic Products*, Jan. 1986, pp. 113.

"Digital Transmitters and Data Acquisition Software—D1000 and D2000 Omegabus® System," product literature, pp. c–41.

"Little G™: The Smart Controller!," *Electronic Products*, Feb. 1996, pp. 146.

*Magnum Opus—Custom Electronic Engineering* Catalog, (EEM 1996), pp. 7, 2025.

W.W. Grainger, Inc. Catalog (#378), pp. 895.

*Thomas Register 1995*, pp. SCA/27964–27945.

*Packaging Machinery Directory 1994–1995*, pp. 290–291, 293–294.

"Triangle Selectacom 360/18—The Jumbo Masters of Big Piece, Large Volume Weighing," product literature, 8 pp.

"Triangle Selectacom 360/14 Computer Combination Scale—The Racing Radial." product literature, 6 pp.

"Triangle Selectacom 360/10 of Big–Piece to Flowable Large Volume fast Weighing—The Jumbo Masters," products literature, 4 pp.

"Triangle Selectacom SPD The Rapid Transit in Computer Weighing," product literature, 6 pp.

"Triangle Acceleron—The Freedom Machines of Form–Fill–Seal," product literature, 6 pp.

"Triangle Acceleron Advantage—Easily the simplest VFFS to run, service, clean ad changeover," product literature, 8 pp.

"Tridyne Process Systems," product literature, 5 pp.

"Tridyne Process Systems, Model F–98" product literature, 2 pp.

"Tridyne Process Systems, Model F–98–6000" product literature, 2 pp.

"Tridyne Process Systems, Model 1650," product literature, 2 pp.

"Tridyne Process Systems, Model F–108," product literature, 2 pp.

"Tridyne Process Systems, Model DF–98–SH" product literature, 2 pp.

"Tridyne Process Systems, Model 600" product literature, 2 pp.

"Tridyne Process Systems, Model 2000 or 200" product literature, 1 pp.

"Tridyne Process Systems," product literature, product applications, customer list 3 pp.

* cited by examiner

COIN HOPPER WEIGHING SYSTEM

CROSS REFERENCE TO RELATED APPLICATIONS

This patent application is a continuation-in-part of U.S. patent application Ser. No. 08/586,513, filed Jan. 16, 1996, now U.S. Pat. No. 5,819,901 which was itself a continuation-in-part of U.S. patent application Ser. No. 08/414,238, filed Mar. 31, 1995. The contents of this patent application are also related to U.S. provisional patent application Ser. No. 60/005,312, filed Oct. 16, 1995. The disclosures of all three of these patent applications are incorporated by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights.

TECHNICAL FIELD OF THE INVENTION

The present invention relates primarily to hoppers which are used to collect and distribute coins in gaming, amusement and vending machines. More particularly, the present invention relates to an apparatus and method for determining the number of coins in a hopper by weighing the hopper and using the collected hopper weight information to deter fraud and theft.

BACKGROUND OF THE INVENTION

For many years, slot machines have been a popular attraction at gambling casinos and other gaming establishments. Such slot machines typically have a color display of gaming indicia, such as cherries, plums, oranges, sevens, etc. arrayed in rows and columns across the front of the slot machine. These gaming indicia can be spun into motion for game play by the insertion of a coin into the slot machine and pulling the slot machine handle. During game play, the inserted coin is collected in a coin reservoir within the slot machine called a "shopper." At the end of game play, the inserted coin will be retained in the hopper if there is a losing combination of gaming indicia shown or, alternatively, may be returned from the hopper to the slot machine player, perhaps with additional coins, if there is a winning combination of gaming indicia shown.

Periodically, slot machine hoppers must be serviced by casino technicians. For example, the hopper may have too few or too many coins and must have its contents adjusted appropriately. Also, coins might be jammed in parts of the hopper in such a way that the hopper cannot function properly If so inclined, a dishonest technician can pilfer a few coins each time he services a slot machine. While each individual instance of such pilfering may not represent a significant threat to a casino's bottom line, the cumulative loss over time from such pilfering can be quite large. Casinos have tried to combat this problem by, among other things, assigning two or more technicians to each task requiring a slot machine to be opened. However, this approach leads to additional labor costs and may not even help if each of the assigned technicians is dishonest.

An alternate existing solution is to seal the hopper so that only trusted money-handling employees working in a cashier's cage can get to the coins. Nonetheless, slot machine hoppers are difficult to seal because such hoppers must typically give out coins after a winning play as well as receive them. Having coins jam in the hopper is also an ongoing concern. In those cases where the hopper is prone to jamming, sealing the hopper would inevitably result in greater down-time for the slot machines and create a loss of slot machine use which could be more detrimental to the casino than the theft loss.

Coins can be pilfered from slot machines hoppers not only by casino technicians but also by the slot machine players. For example, a player might attach a string to the coin he is inserting into the slot machine so that he can retrieve the coin from the slot machine by simply pulling the string after the coin has been erroneously counted as "received" by the slot machine and game play has begun. Also, the player might try to jam the payout counter after receiving a winning combination so that the slot machine continues to eject coins well in excess of the amount to which the player is entitled.

Unfortunately, merely counting passing coins as they go into the hopper and counting passing coins as they leave the hopper would not solve these types of theft problems. In the case of player fraud, the player can effectively fool or otherwise disable the existing types of coin counters. Similarly, in the case of technician fraud, such a physical inventory would only indicate that coins are missing, not who took them.

Prior art systems exist to count coins by weighing them. For example, U.S. Pat. No. 5,193,629 issued to Lare and U.S. Pat. No. 4,512,428 issues to Bullivant describe apparatuses for weighing coins. Nonetheless, while such weighing devices might be suitable for weighing coins in a money room, they are unsuitable for weighing coins in a vibration-prone gaming machine environment where the hoppers being weighed must be enclosed to prevent theft by players.

SUMMARY OF THE INVENTION

The present invention provides apparatuses for weighing coins in a coin hopper. In one preferred embodiment, the weighing apparatus is constructed integrally with the coin hopper assembly and fits between the coin hopper and its base plate. In other preferred embodiments, the weighing apparatus is constructed separately from the coin hopper assembly. In these other preferred embodiments, the weighing apparatus includes upper and lower plates which are separated by one more weighing instruments, such as load cells with strain gauges. In operation, the lower plate of this weighing apparatus is typically placed against the floor of the slot machine and the hopper is then simply placed on top of the weighing apparatus' upper plate.

The present invention also provides a method of detecting fraud or theft using a suitable coin weighing apparatus. As part of this method, the weighing apparatus takes periodic readings of the number of coins residing in the hopper and can communicate those readings. Using a preferred method of the present invention, the unauthorized removal of coins during an actual or purported technician maintenance procedure can be detected by determining a count of coins by weight when the slot machine door is opened, determining a count of coins by weight once the slot machine door is closed, and using those two counts to determine the change in the number of coins in the hopper at the time of servicing. The identity of the person opening the hopper door and the time at which the hopper door is opened and closed can be recorded, along with any detected discrepancy. The calculation of any detected discrepancy may take into account an expected change in coin count. An expected change in coin count would exist when a technician is asked to open the machine and either remove or insert coins.

A similar method can also be used to detect a player's theft of coins from the slot machine. In this method, the actual number of coins in the hopper can be determined by weight and compared with the expected number of coins in the hopper in order to determine if the player has inappropriately been withholding or taking coins from the slot machine. If any unexpected coin discrepancy is detected by the weighing apparatus of the present invention, it can be communicated to appropriate security personnel in real time through a computer hook-up or alarm or, alternatively, communicated periodically through downloading of stored hopper weight information.

A further understanding of the nature and advantages of the present inventions may be realized by reference to the remaining portions of the specification and the attached drawings.

DESCRIPTION OF THE PREFERRED EMBODIMENTS

Figure 1:
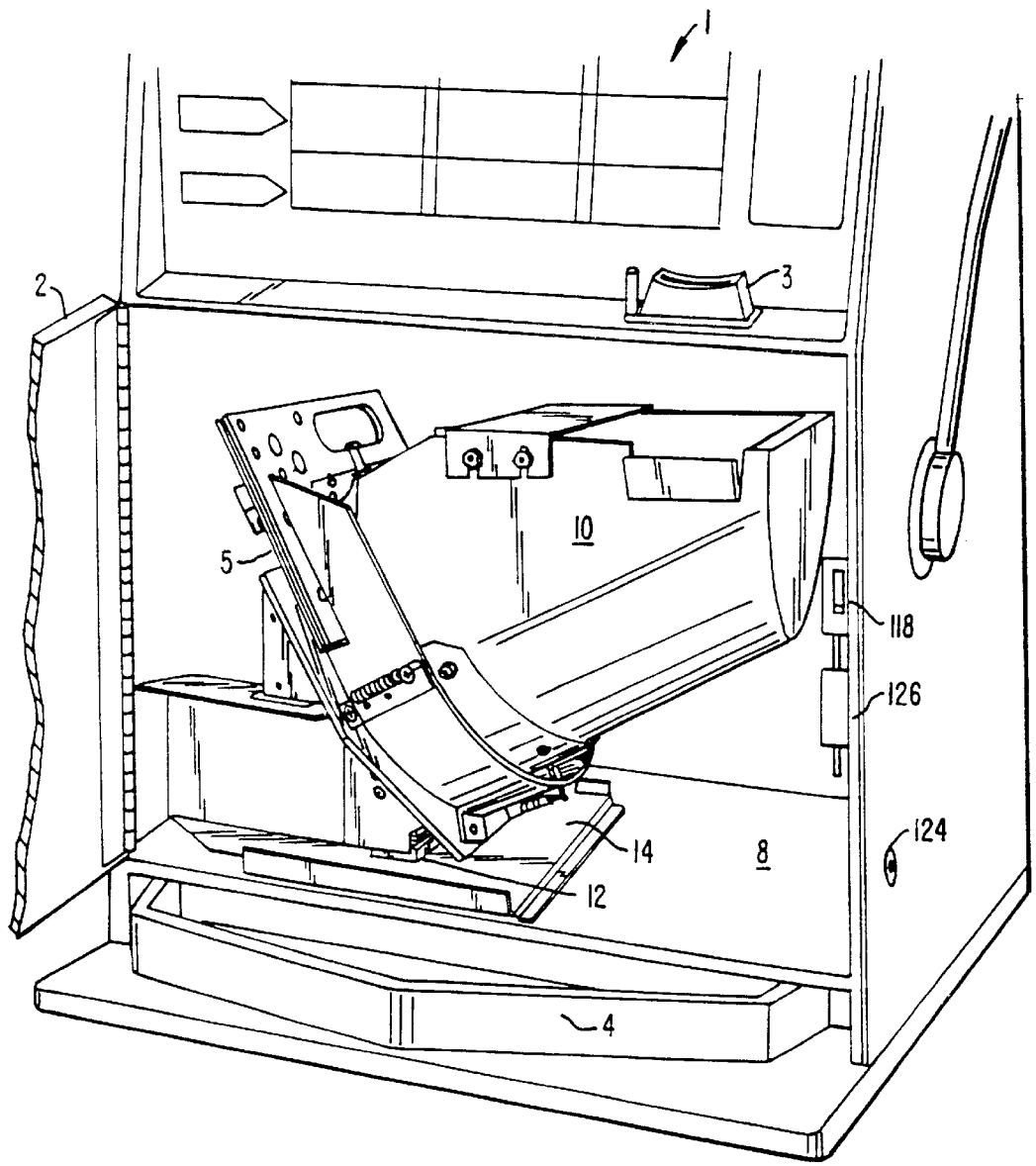
FIG. 1 is a front view of a slot machine with its door open showing a coin hopper and integrated weighing apparatus of the present invention.

FIG. 1 illustrates a coin hopper assembly 9 in a slot machine 1 which incorporates an integrated form of coin weighing apparatus 12 of the present invention. This coin hopper assembly 9 includes a coin hopper 10, hopper base plate 14 and integrated coin weighing apparatus 12. To show the placement of the hopper assembly 9 in the slot machine 1, the hopper door 2 of slot machine 1 is shown in an open position. Nonetheless, during operation, the hopper door 2 would usual be locked shut to prevent theft of coins. As shown here, hopper 10 is often placed below a coin insertion slot 3 and above a coin payout tray 4.

To initiate play of a game, a player would insert one or more coins into coin insertion slot 3 and those coins would drop into coin hopper 10. Although not shown in FIG. 1, the coins would typically pass through a coin handling unit on their way to coin hopper 10. This coin handling unit performs tests (size, weight, angular momentum, etc.) to determine if the coin is real and of the proper denomination. The coin handling unit, or other device, would provide a signal, such as an electric "coin in" pulse, to a logic board to indicate that a valid coin has been inserted (See, FIG. 9).

If the game is a winning game, or the player cashes out his or her credits, coin hopper 10 ejects the correct amount of coins from ejection slot 5 into payout tray 4. In some embodiments, such as so-called "slant-top" slot machines, the hopper 10 is actually located below the payout tray and an "elevator" or "escalator" mechanism is used to raise the paid out coins higher than the payout tray so that the coins will fall into the payout tray, and thus be accessible to the player. Typically, a motorized conveyor assembly (not shown) of coin hopper 10 causes coins to be ejected to the payout tray or elevator and that conveyor assembly runs until a "coin out" counter indicates that the correct number of coins have been ejected.

Figure 2:
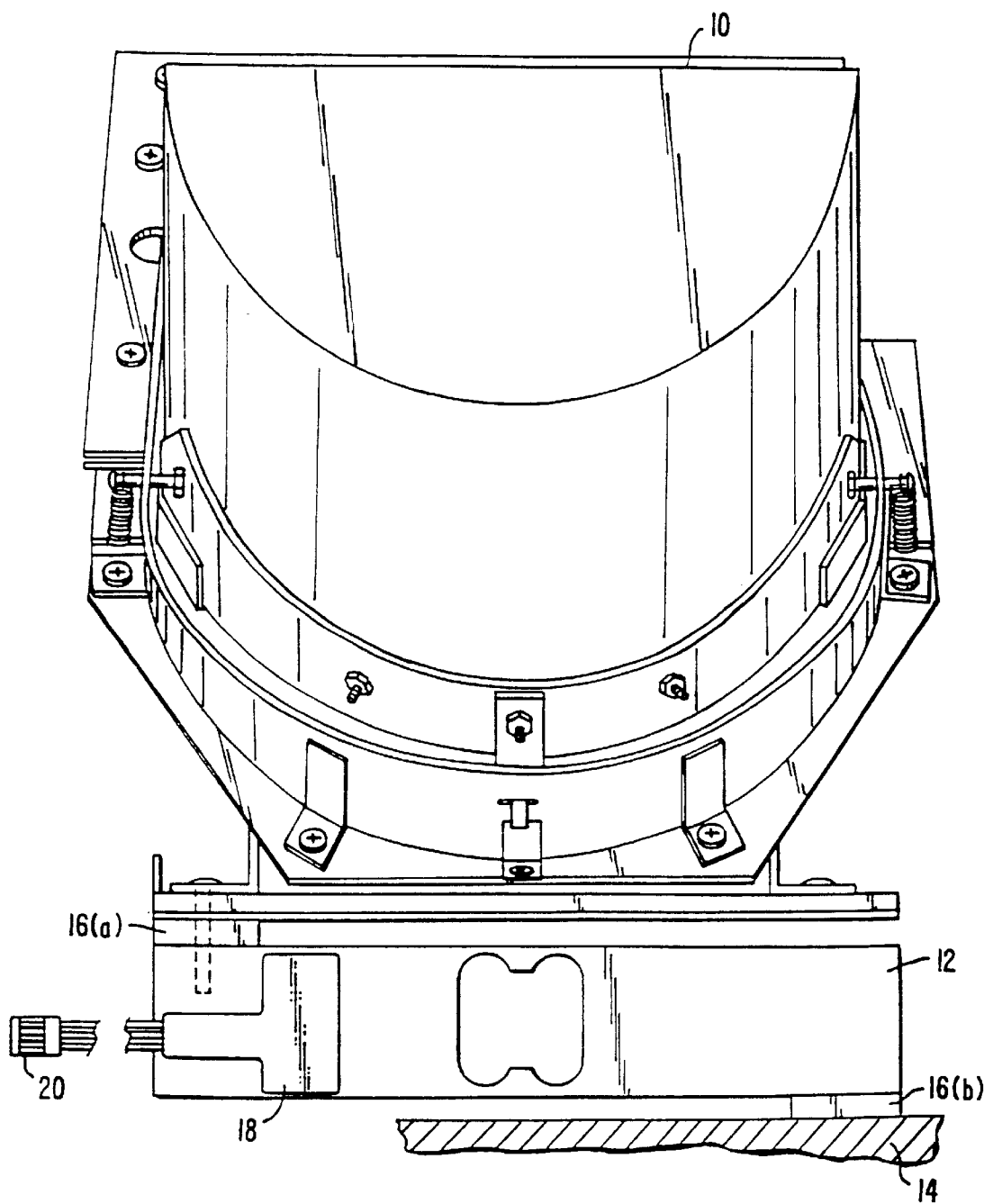
FIG. 2 is a more detailed side view of the coin hopper shown in FIG. 1 illustrating the cantilevered mounting of the integrated weighing apparatus of the present invention onto the coin hopper.

FIG. 2 provides a close-up view of how the integrated form of coin weighing apparatus 12 of FIG. 1 is mounted in the coin hopper assembly 3. In this preferred embodiment, the coin weighing apparatus 12 includes a load cell 13 and strain gauge 18. This coin weighing apparatus 12 is mounted between the coin hopper 10 and hopper base plate 14. The coin weighing apparatus 12 is affixed to the coin hopper 10 by a cantilevered spacer 16($a$) and an appropriate fastener 17. At its diagonally opposite end, the coin weighing apparatus 12 is also affixed to the hopper base plate 14 by a cantilevered spacer 16($b$) and an appropriate fastener (not shown). In this arrangement, coin hopper 10 is totally supported by cantilever spacer 16($a$), which is in turn totally supported by coin weighing apparatus 12, which is turn totally supported by cantilever spacer 16($b$) mounted directly to base 14. Thus, the weight of the coin hopper 10 and its coins is applied to the load cell 13 of the coin weighing apparatus 12 causing a strain on the load cell 13 which is a function of the weight of the coin hopper 10 and its coins. That strain is measured by a strain gauge 18 and electrically conveyed to a suitable electronic monitoring apparatus (not shown) by the lines of cabling 20. In this preferred embodiment, load cell 12 might suitably be a Model 1040 digital load cell or Model 1041 analog load cell manufactured by Tedea Huntleigh of Canoga Park, Calif. Alternatively, the load cell 12 might suitably be a 36 kilogram analog load cell sold by HBM, Inc. of Connecticut with a Cirrus Logic strain gauge sensor. For larger coin hoppers 12, a 72-kilogram analog -Load cell sold by HBM, Inc. might be used. Compression, sub-miniature and strip sensor types of load cells may suitably be used with the weighing apparatus of the present invention.

The coin weighing apparatus 12 shown in FIGS. 1 and 2 is referred to as "integrated" into the coin hopper assembly 9 because it is situated between the coin hopper 10 and hopper base plate 14. For existing slot machines, installation of this integrated form of coin weighing apparatus 12 typically involves removing the coin hopper assembly 9 from the slot machine 1 and separating the coin hopper 10 from the hopper base plate 14. The coin weighing apparatus 12 can then be integrated into the coin hopper assembly 9 by affixing it to the coin hopper 10 and hopper base plate 14 as shown in FIG. 2.

Figure 3:
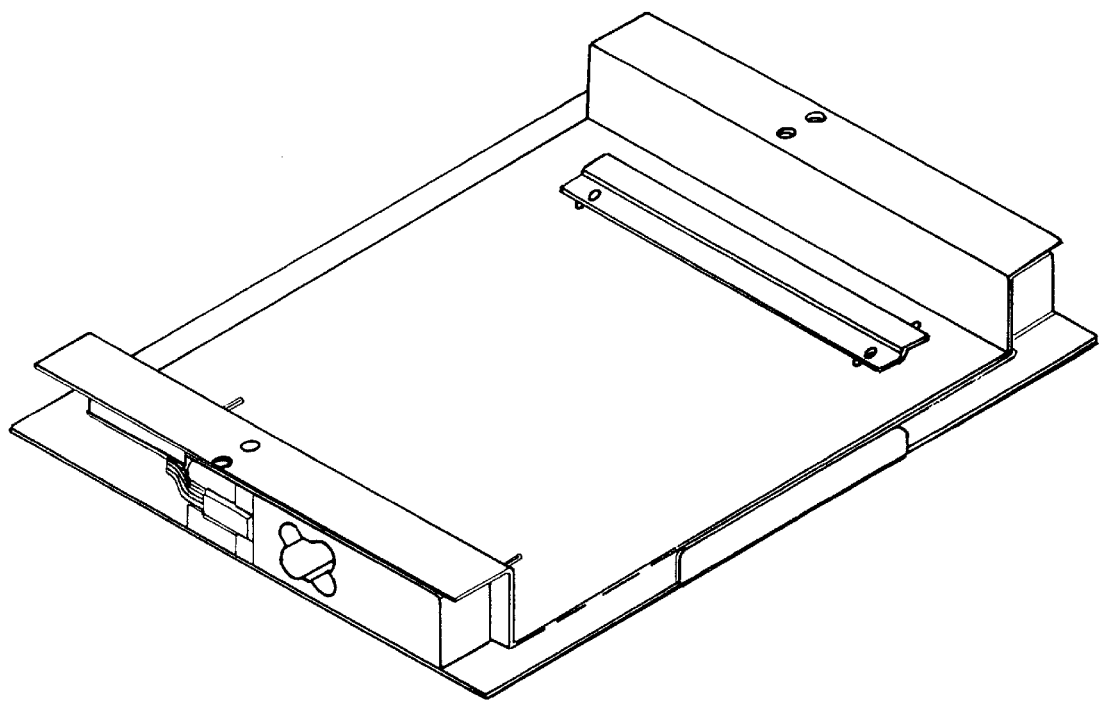
FIG. 3 is a perspective view of a preferred form of stand alone weighing apparatus of the present invention.
Figure 4:
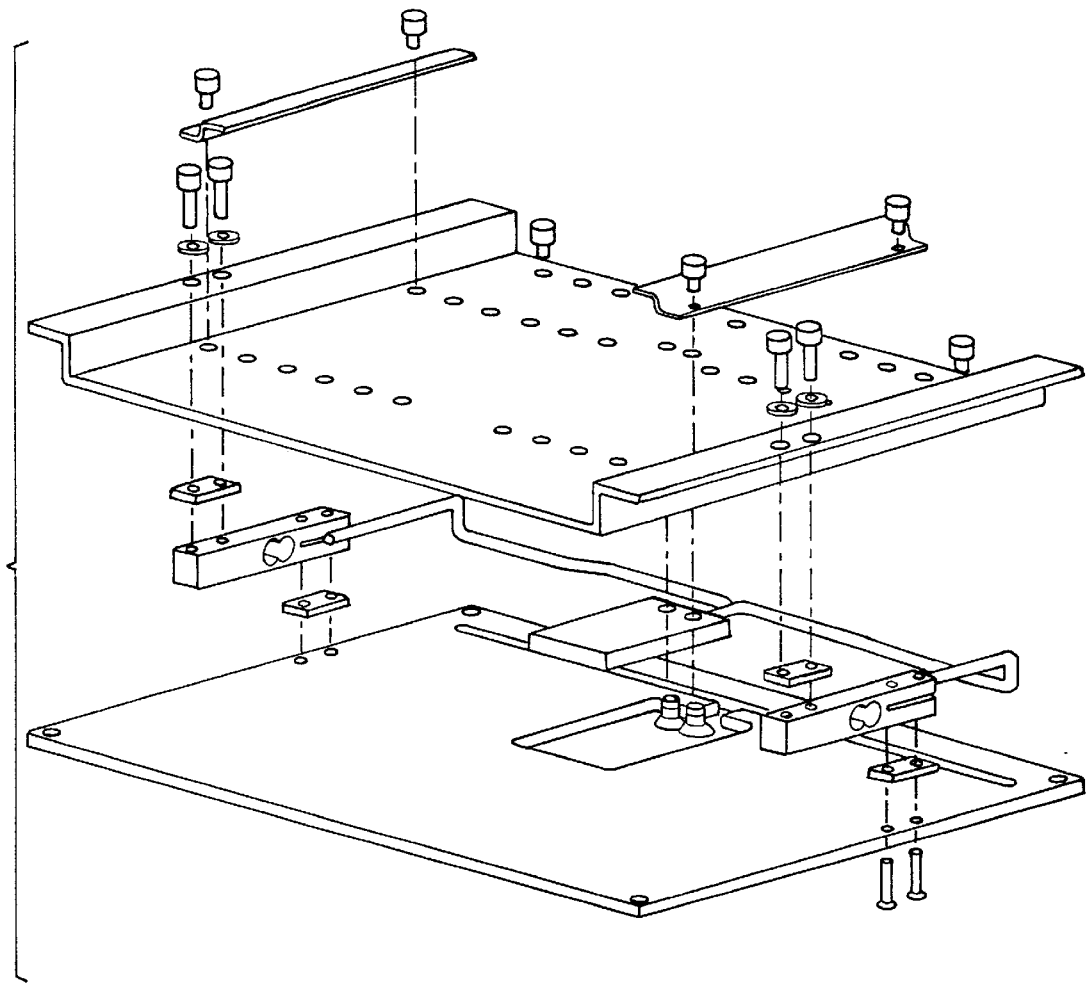
FIG. 4 is an exploded perspective view of a preferred form of stand alone weighing apparatus of the present invention incorporating a full upper plate and two small load cells.
Figure 5:
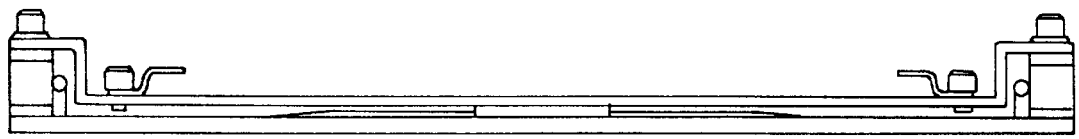
FIG. 5 is a front view of the preferred form of stand alone weighing apparatus shown in FIG. 4 which incorporates a full upper plate and two small load cells.

For those who find the process of integrating the coin weighing apparatus 12 into the coin hopper assembly 9 to be troublesome, a stand-alone form of coin weighing apparatus 22 can be used, such as that shown in FIGS. 3–5. For this stand-alone coin weighing apparatus 22, there is no need to separate the coin hopper 10 from its base plate 14. The entire coin hopper assembly 9 can simply be placed as a unit on top of the stand-alone coin weighing apparatus 22.

The stand-alone form of coin weighing apparatus 22 shown in FIG. 3–5 includes an upper plate 24, a lower plate 26, two load cells 28, spacers 36, 38, two guide rails 30 and an analog-to-digital converter 34. The upper plate 24, lower plate 26 and two guide rails 30 can advantageously be made of alloy steel. The two load cells 28 and spacers 36, 38 can advantageously be made of aluminum. The two load cells 28 of this stand-alone coin weighing apparatus 22 are mounted between the upper plate 24 and lower plate 26. To maintain balance, the two load cells 28 are preferably on opposite sides of the coin weighing apparatus 22 and mounted parallel to one another as shown in FIGS. 3–5. As best shown in FIG. 5, the central section 25 of the upper plate 24 is recessed downward so that insertion of the stand-alone coin weighing apparatus 22 into an existing slot machine 1 will raise the height of the coin hopper assembly 9 in that slot machine 1 as little as possible. In other words, the preferred form of stand-alone coin weighing apparatus 22 is designed to minimize the height profile of the central section 25 upon which the coin hopper assembly 9 will be resting.

To assemble the stand-alone coin weighing apparatus 22 shown in FIGS. 3–5, both load cells 28 are affixed at on of their upper edges to the elevated side sections 37 of the upper plate 24 by means of suitable fasteners, such as hex bolts 35, and spacers 36. Both load cells 28 are then affixed at their diagonally opposite lower edge to the lower plate 26 also by means of suitable fasteners, such as flat head metal screws 39, and spacers 38. As with the integrated coin weighing apparatus 12 shown in FIGS. 1–2, by making the load cell attachments at diagonally opposite upper and lower edges of the load cell 28, a cantilever effect is created on the load cell 28 which is important to the load cell's efficient operation. Also, like the integrated coin weighing apparatus shown in FIGS. 1–2, a strain gauge 32 is inserted into the load cells 28 shown in FIGS. 3–5 which is attached by wire cable 20 to a suitable electrical monitoring apparatus (FIG. 3). In FIG. 4, the wire cable 20 is shown to first be connected to an analog-to-digital converter 34 which converts the analog measurements from the strain gauge 32 into digital form. Also, as shown in FIG. 4, a cutout 41 is made in the lower plate 26 to seat the analog-to-digital converter 34. This cutout 41 is necessary to maintain a gap 40 (FIG. 5) between the upper plate 24 and lower plate 26 by preventing the analog-to-digital converter 34 from being wedged between the two plates 24, 26. If desired, the analog-to-digital converter 34 can be attached to the upper plate 24 through use of suitable fasteners 42.

Affixed to the indented central section 25 of the upper plate 24 are two guide rails 30. Using suitable fasteners, such as hex bolts 31, these guide rails 30 are mounted in parallel from the front to the back of the upper plate 24 so that they face one another. These guide rails 30 are used to firmly hold the base plate 14 (FIG. 1) of the coin hopper assembly 9 in its correct position. If desired, one of the guide rails 30 can be laterally adjustable to accommodate different sizes of hopper base plates 14. This guide rail 30 can be made laterally adjustable by machining a lateral slot or series of holes 27 in the upper plate 24 to allow this guide rail 30 to be affixed with fasteners 31 to the upper plate 24 at a variety of positions. To combine a coin hopper assembly 9 with the stand-alone coin weighing apparatus 22 shown in FIGS. 4–5, one simply slides the base plate 14 of the coin hopper assembly 9 (FIG. 1) under the raised portion of the two guide rails 30. By confining the sides the base plate 14, the guide rails 30 not only correctly position the coin hopper assembly 9, but also restrict both side-to-side and up/down movement of the coin hopper assembly 9.

Figure 6:
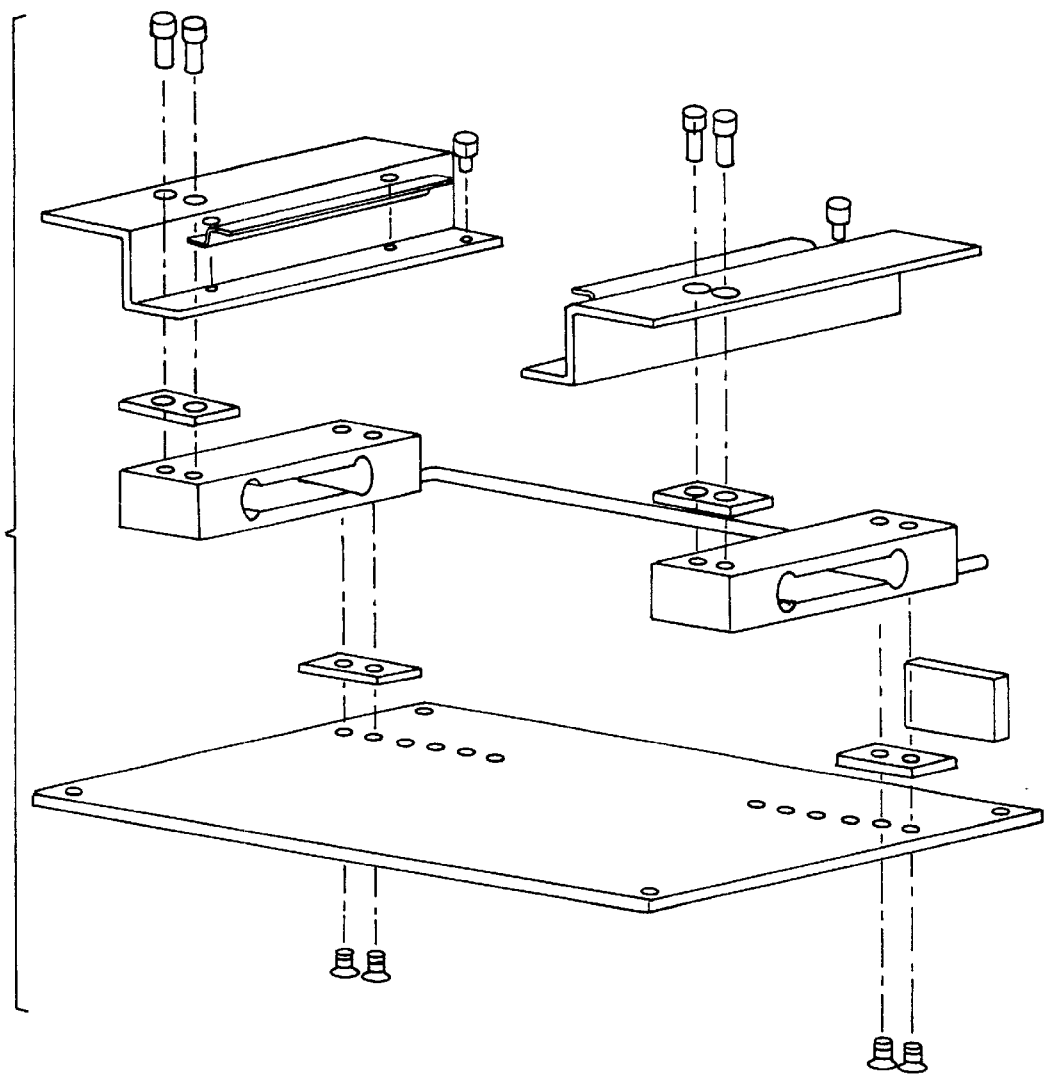
FIG. 6 is an exploded perspective view of an alternative preferred form of stand alone weighing apparatus of the present invention incorporating an abbreviated upper plate and two large load cells.
Figure 7:
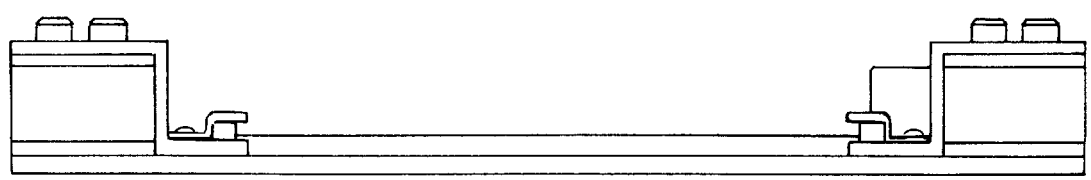
FIG. 7 is a front view of the alternative preferred form of stand alone weighing apparatus shown in FIG. 6 incorporating an abbreviated upper plate and two large cells.

An alternative form of stand-alone coin weighing apparatus 43 is shown in FIGS. 6–7. Like the previous form of stand-alone coin weighing apparatus. 22, this alternative form of stand-alone coin weighing apparatus 43 includes a lower plate 48, two load cells 45, spacers 36, 38 and two guide rails 30. The primary difference between this alternative form of stand-alone coin weighing apparatus 43 and the previous stand-alone coin weighing apparatus 22 is the fact that the central section 25 of the upper plate in the previous stand-alone coin weighing apparatus 22 is missing from this alternative version 43. Instead, the upper plate 46 from this alternative version 43 is formed in two separate pieces. This elimination of the central portion 25 of the upper plate saves weight and cost as compared with the previous coin weighing apparatus 22, but loses some of the stability which a unitary upper plate 24 provides. The load cells 45 in this alternative stand-alone embodiment are also larger than the load cells 28 in the previous stand-alone embodiment.

Apart from these differences, the alternative stand-alone embodiment 43 is configured in essentially the same way as the previous stand-alone embodiment 22. The load cells 45 in this alternative embodiment are placed in parallel, at opposite sides of the coin weighing apparatus 43 and affixes at one edge to their respective upper plate sections 46 by suitable fasteners, such as hex bolts 35, and spacers 36. The load cells 45 are also affixed at diagonally opposite edges to the lower plate 48 by suitable fasteners, such as flat head metal screws 39, and spacers 38. Also, like the previous stand-alone embodiment, guide plates 30 are provided on each upper plate piece 46 to accept the hopper base plate 14 (FIG. 1)

Figure 8:
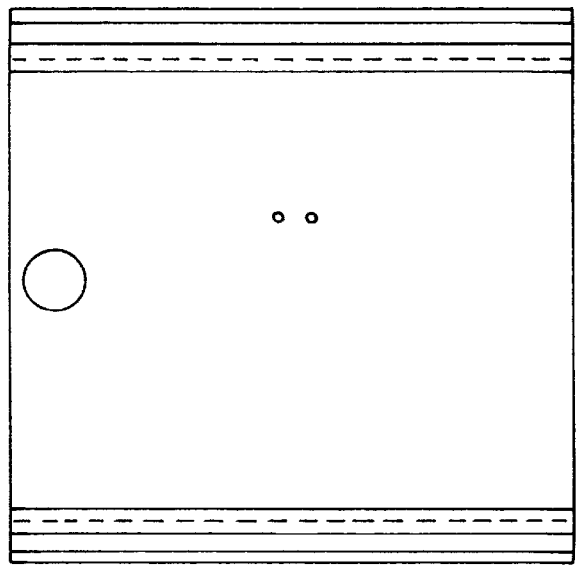
FIG. 8 is a exploded perspective view of a second alternative preferred form of stand alone weighing apparatus.
Figure 8:
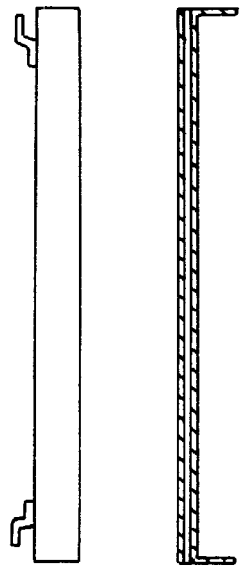
Figure 8:
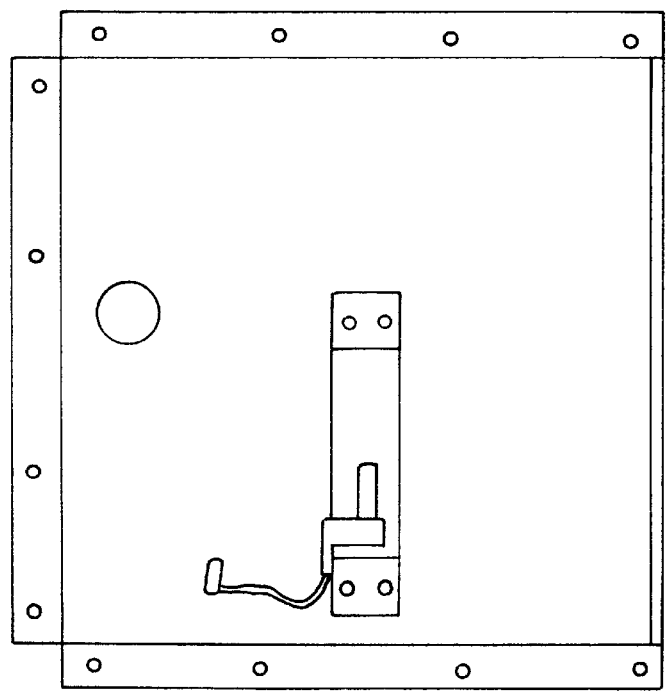
Figure 8:
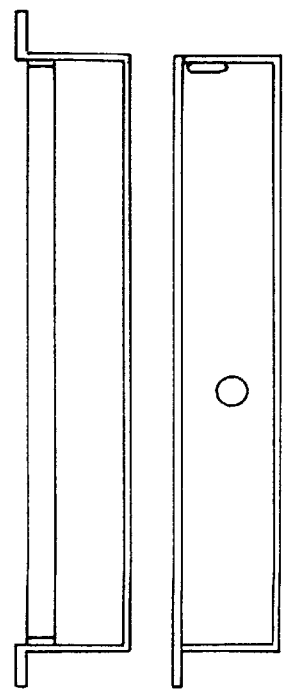

A second alternative embodiment of a stand-alone coin weighing apparatus 50 is shown in FIG. 8. This second alternative embodiment of stand-alone coin weighing apparatus 50 includes an upper plate 52, lower plate assembly 54, a single load cell 56 and guide rails 58. The lower plate assembly 54 in this embodiment includes a lower plate 60, lower plate assembly sides 62 and lower plate assembly flanges 64. As before, the load cell 56 is both affixed to and interposed between the upper plate 52 and lower plate 60. The load cell 56 is preferably affixed to these two plates 52, 60 on diagonally opposite load cell edges so as to create a cantilever effect.

The principal differences between this second alternative stand-alone embodiment 50 and the previous stand-alone embodiments 22, 43 involve the load cell 56, guide rails 58 and lower plate assembly 54. In this stand-alone embodiment, only one load cell 56 is used. As compared with the two load cell embodiments, use of a single load cell 56 will obviously cost less. If desired, a single load cell interposed between the central sections of the upper and lower plates as shown in FIG. 8 can also be used with the stand-alone coin weighing apparatus embodiments 22, 43 shown in FIGS. 3–7 instead of the two load cells 28, 45 which are shown for those embodiments.

The guide rails 58, 30(a) illustrated for this embodiment and in FIG. 3 are turned outward rather than inward. This outward facing of the guide rails 58, 30(a) is designed to accommodate a hopper base plate (not shown) which has its lateral edges curled under. As with the previous inward facing guide rail embodiment, the purpose of these outward facing guide rails 58 is both to correctly position the coin hopper assembly as well as to restrict side-to-side and up/down movement of the coin hopper assembly.

The lower plate assembly 54 in this second alternative embodiment is particularly useful where the hopper 10 cannot be raised in elevation in the slot machine 1. In these circumstances, a cutout in the shape of the lower plate 60 (not shown) can be made in the floor 8 (FIG. 1) of the slot machine 1. The lower plate assembly 54 of this embodiment can then be dropped into place through this cutout in the slot machine floor 8 so that the lower plate assembly flanges 64 rest against the slot machine floor 8 along the edges of the cutout. The lower plate assembly 54 can then be attached to the slot machine floor 8 by affixing suitable fasteners through flange holes 65 and into the slot machine floor 8. As such, most, if not all, of the coin weighing apparatus 50 in this application will rest below the slot machine floor 8 and not change the elevation of the hopper 10 in the slot machine 1.

Figure 9:
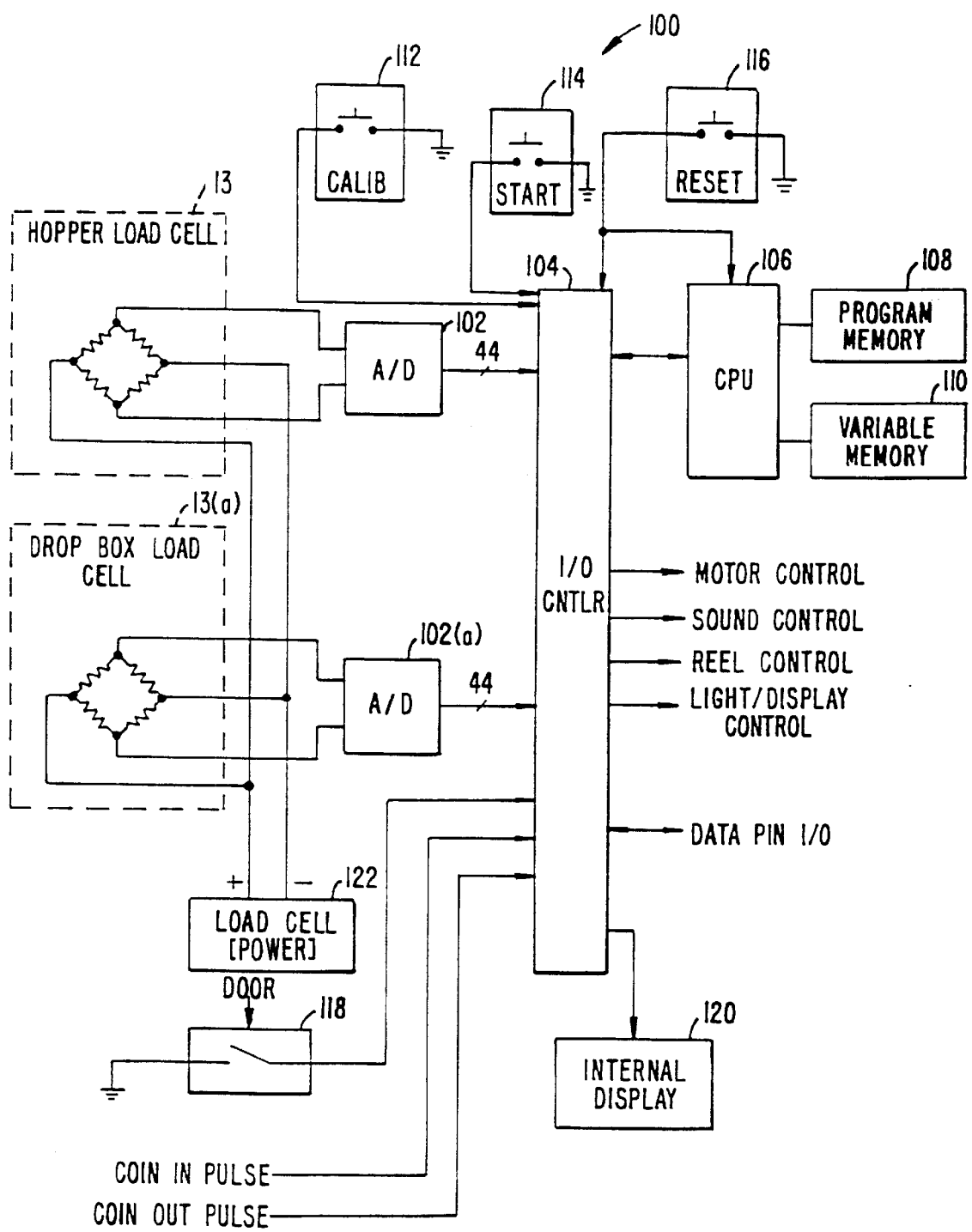
FIG. 9 is a schematic diagram of the accompanying electronics for the weighing apparatuses shown in FIGS. 1–8.

Referring now to FIG. 9, a schematic of a preferred logic board 100 used in the present invention is shown. In an alternative embodiment, the role of the logic board is subsumed into a central slot machine control system. The logic board comprises an analog-to-digital converter 102 (A/D) coupled to load cell 13 to convert a load signal from an analog signal to a digital load cell sample. In the preferred embodiment, the digital load cell sample has a resolution of 20 bits, but other resolution analog-to-digital converters can also be used (e.g., 14 bits or greater). With a lower resolution 14 bit digital load cell, an integer corresponding to the digital load cell sample can range from 0 to 16,383. With proper calibration and proper selection of load cell 13, a fully loaded hopper will cause a reading near the top end of the range, so as to have the best resolution.

A/D 102 provides its output to an input-output (I/O) controller 104 which in turn provides samples, as requested, to a central processing unit (CPU) 106. A suitable I/0 controller for the present invention would be a 75HCT245 chip. CPU 106 executes programs stored in program memory 108 and uses a variable memory 110 to store data incident to the execution of those programs. The programs executed by CPU 106 comprise instructions for following the processes described in FIGS. 10–14, however CPU 106 might also execute other programs not described herein. In some embodiments, a CPU with built-in I/O control functions and/or memory might be used, however the description of FIG. 9 still applies to such integrated systems.

FIG. 9 shows a number of I/O signals being provided to, or by, I/O controller 104. For example, "Coin In" and "Coin Out" signals are provided from coin handling devices. These signals can be pulses (one pulse per coin) or can be other signals indicating a count, as are well known in the art. I/O controller 104 might also provide motor, sound, reel, lights and display control signals, if CPU 106 or I/O controller 104 are programmed to handle such functions of slot machine 1. I/O controller 104 receives switch signals from a variety of sources, of which a calibration switch 112, a start switch 114, a reset switch 116 and a door switch 118 are shown. FIG. 9 also shows an internal display 120.

Also shown in FIG. 9 is a drop box load cell 13(a) and an A/D 102(a) coupled to I/O controller 104. A drop box is a standard part of some slot machines and is used to contain the overflow of coins from a hopper. For example, in FIG. 1, a drop box might have been installed below hopper 10. A drop box is similar to a hopper, in that it holds a collection of coins, but differs from a hopper in that coins are not ejected from the drop box. If a drop box is used, a hopper may have a sensor, such as a coin weighing apparatus of the present invention, which detects when the hopper is full. If the hopper is full, coins are ejected from the hopper in such a way that the ejected coins fall into the drop box instead of into payout tray 4. Drop box load cell 13(a) performs a function similar to the coin hopper load cell 13 insofar as it provides an indication of the weight of a drop box (not shown) and the coins therein. This drop box load cell 13(a) may preferably be configured in any of the ways previously described. Along the same lines, a coin weighing apparatus of the present invention could be used to weigh coin fill bags which are stored in the slot machine to conveniently replenish empty coin hoppers as well as other types of drop containers. Theft or fraud can be detected by such a coin weighing apparatus when the weight of the fill bag changes without good cause.

I/O controller 104 also reads/writes data from a data pin 124 (see FIG. 1). In a preferred embodiment, data pin 124 is part of a communication system manufactured by Dallas Semiconductor. A data wand (not shown) is a hand-held, battery-powered device with an internal computer which communicates with I/O controller 104 through a single signal line and chassis ground connection. In one application, a data wand can be used in conjunction with data pin 124 to calibrate the coin weighing apparatus 12, 22, 43, 50.

In operation, load cells 13, 13(a) are provided with load cell power from a load cell power source 122 and generate an analog voltage which is a function of their load. This analog voltage is input to the load cell's A/D 102 or 102(a).

Figure 10:
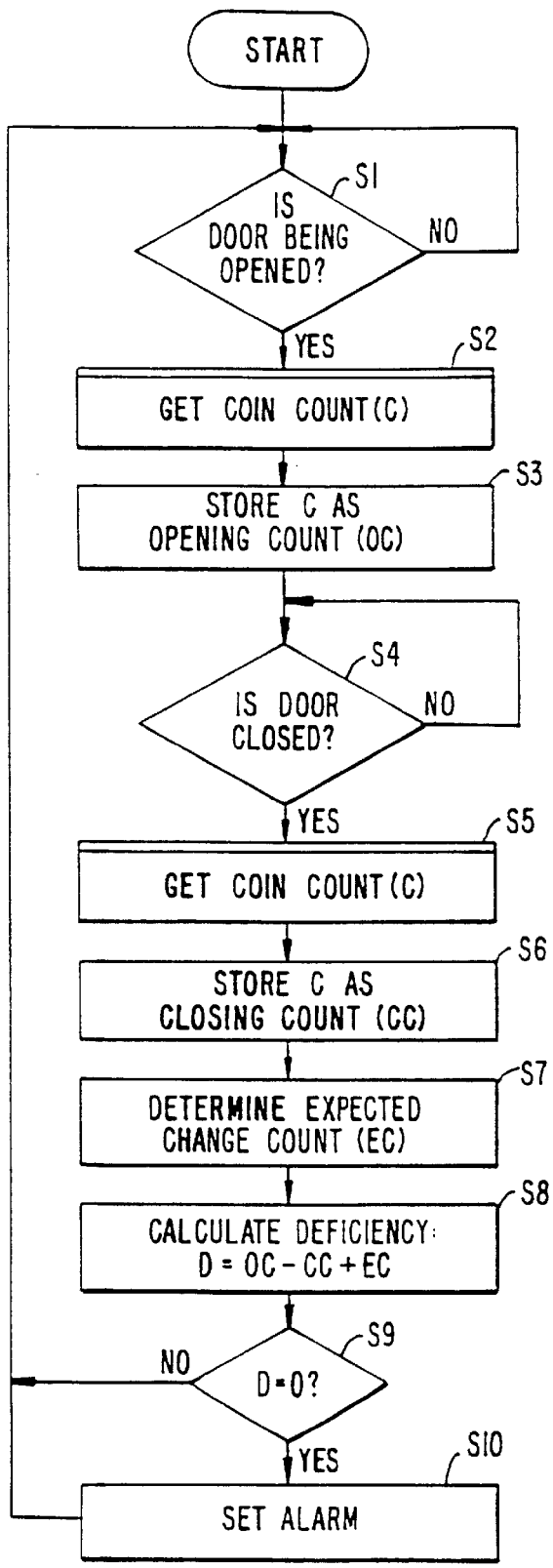
FIG. 10 is a flowchart of an accounting process for to detect coin hopper theft in a timely manner.

FIG. 10 is a flowchart of a process for detecting coin fraud or theft by a service technician. This process is controlled by CPU 106 according to instructions stored in program memory 108. Each step in FIG. 10 is numbered with a sequential step number, except where noted. The process shown in FIG. 10 begins when hopper door 2 (see FIG. 1) is opened (S1). This process assumes that the primary mode of coin theft is from dishonest technicians or other casino employees opening slot machine door 2 to perform actual or purported maintenance and taking coins from hopper 10 while hopper door 2 is open. Presumably, a game cannot be played and a payout cannot be made while door 2 is open and therefore a coin count should not change except in cases of authorized coin withdrawal. In a preferred embodiment, hopper door 2 is secured by an electronic switch, such as a solenoid 126 (see FIG. 1), which can only be activated by the technician or employee touching their assigned data wand to data pin 124. As part of the opening process, CPU, 106 records an employee ID communicated from the data wand before activating solenoid 126 to open hopper door 2. Alternatively, hopper door 2 can be opened by an ordinary key and the door opening can be detected by door switch 118. In either case, a preferred embodiment records the time of opening.

When hopper door 2 is being opened, or preferably just before hopper door 2 moves, a coin count is obtained (S2)

and the count is stored (53) as the opening count (OC). If CPU 106 makes continuous, periodic readings, then the opening count (OC) might just be the most recent periodic reading before hopper door 2 was opened and after the last game was played.

At step S4, the door is monitored until it is closed, and another coin count is taken (S5). In a preferred embodiment, this second coin count is a reading taken after slot machine 1 has stabilized following the closing of the door. This coin count, C, is stored (S6) as the closing count (CC). Next (S7), an expected change count (EC) is determined. This expected change count is positive in the case where a technician is sent to a slot machine to add coins to a depleted hopper, is negative where the technician is sent to the slot machine to remove coins, and is zero where the technician is sent to the slot machine simply to perform maintenance. Of course, other variations of this scheme are also possible. For example, the expected change count might not be known at the time the coins are removed, but later determined after the technician turns over the coins removed from the slot machine.

If the expected change count is known at the time the door is closed, a deficiency can be easily calculated (S8), by subtracting the closing count (CC) from the opening count (OC) and adding the expected change count (EC). If the resulting deficiency (D) is not equal to zero (S9), then an alarm can be set (S10). Where the slot machine does not automatically determine the identification of the technician or other employee opening the slot machine, the setting of an alarm might result in a flashing light on the slot machine being immediately activated, so that the unauthorized removal of coins can be detected by a floor manager while the thief is still present at the machine. However, in a preferred embodiment, the slot machine detects the time of opening and closing as well as the identification of the person opening the machine, thereby allowing the deficiency to be easily traced to a specific employee. In an alternate embodiment, where the slot machine is not able to determine the identity of the person opening the slot machine, the slot machine will merely record the time of entry and the deficiency for later comparison to a log kept elsewhere showing which employees had access to which slot machines at which times. In a preferred embodiment, the alarm is not merely a local alarm in the form of a flashing light on the slot machine or the like, but is an alarm which is recorded by CPU 106 and is communicated to a central security station (not shown). Regardless of whether an alarm is set or not, the flow of the process returns to step S1, where it remains until the hopper door is again opened.

While the process shown in FIG. 10 will detect unauthorized removal of coins when a hopper door 2 is open, it does not necessarily detect unauthorized removal of coins when hopper door 2 is closed. The latter type of unauthorized coin removal might arise when the dishonest employee or technician modifies the slot machine to eject or reroute coins out of the hopper 10 into other spaces inside slot machine 1 for later retrieval. This latter type of closed door removal may also occur when a dishonest player tampers with the coin in or coin out mechanisms of the slot machine. This manner of closed door theft can be counteracted by monitoring the rate at which coins fail to reach hopper 10 or fail to be counted as they are ejected by comparing hopper weight to the "coin in" or "coin out" pulses to the I/O controller 104 and CPU 106 (FIG. 9). Similarly, if a dishonest player inserts slugs or other types of counterfeit coins into the slot machine which have a different weight than valid coins, a comparison of the expected weight of valid coins in the coin hopper with the actual weight of counterfeit coins in the coin hopper can be used to detect this type of fraud. With centralized monitoring of slot machine activity, the unaccounted for loss of coins or discrepancy in coin weight while hopper door 2 is closed can be monitored for each slot machine and those slot machines with higher than normal rates of coin loss or coin weight discrepancy can be carefully inspected. Coin loss from the hopper to the drop box during normal operation can be accounted for through the use of load cell 13($a$) and ADC 102($a$), as described above.

In a preferred embodiment, the slot machine activity is communicated to a central security station for easy monitoring and prompt detection of deficiencies. The automatic coin accounting process of FIG. 10 is a process which can be run independently of the coin counting processes shown elsewhere. The use of the present invention to handle other modes of theft or coin accounting should be apparent after reading this present description.

Figure 11:
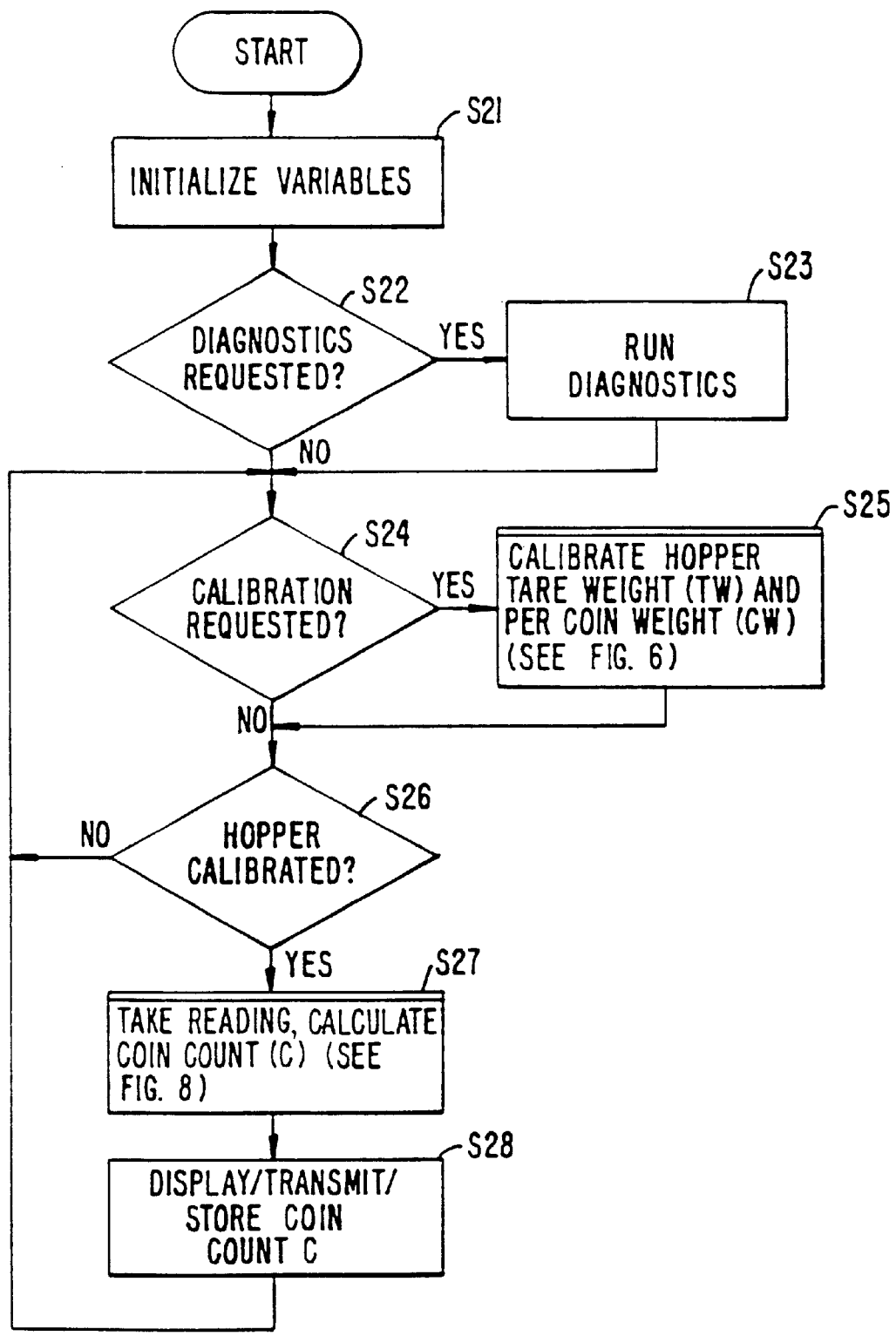
FIG. 11 is a flowchart of a process for automatically taking periodic measurements to determine a coin count in the hopper.

While FIG. 10 shows a process of deficiency detection, FIG. 11 shows a more general process of taking a reading to calculate coin count C. In a preferred embodiment, the processes of FIG. 10 and the processes of FIG. 11 run asynchronously, with the process shown in FIG. 11 being a process of periodically taking a reading to update the current coin count while the process shown in FIG. 10 (more specifically steps S2 and S5) merely refers to an episodic coin count when the slot machine door 2 is opened or closed.

Referring now to FIG. 11, the process shown therein begins with an initialization of the variables used (S21). A this point, the operator is prompted with "START" or a similar prompt, prompting the operator to begin the calibration process. The prompt is displayed, in some embodiments, on a computer terminal, while in other embodiments it is displayed on an internal display 120 coupled to I/O 104 (see FIG. 9). Preferably, the operator first determines that the hopper and slot machine are stable and the hopper is empty.

At step S22, CPU 106 (see FIG. 9) determines whether diagnostics were requested by the operator. In one embodiment, the operator signals that diagnostics are requested by sending a predetermined signal from a terminal to I/O controller 104 such as through the data pin I/O or by simultaneously pressing calibration button 112 and start button 114 (see FIG. 9). If diagnostics are requested, CPU 106 executes those diagnostics (S23) and proceeds to step S24. Otherwise, if diagnostics are not requested, CPU 106 proceeds directly to step S24.

At step S24, CPU 106 checks to see if the operator has requested a calibration. In the embodiment shown in FIG. 12, the operator requests calibration by pressing calibration button 112. If calibration is requested, the calibration process is executed (S25) to determine a tare weight (TW) and a per coin weight (CW). Following the calibration step, which is described in further detail in FIG. 12 or if calibration is not requested, CPU 106 proceeds to step S26, where it determines whether or not the hopper was calibrated. If the hopper was not calibrated, either because calibration was not requested or because the calibration step was not successful due to unreliable readings, CPU 106 returns to step S24, thus creating a loop that is only exited when the hopper is finally calibrated.

When the loop is exited, CPU 106 proceeds to step S27, where a reading of the hopper weight is taken and a coin count is calculated. This process is shown in further detail in FIG. 14. Once a reliable coin count is obtained (S28), that coin count is displayed, transmitted to a remote storage and/or display device or the coin count is simply stored in variable memory 110 (see FIG. 9) for later provision of a coin count value to other processes which use the coin count. Once the coin count is obtained and processed as described above, CPU 106 returns to step S24. Thus, while the hopper remains calibrated, CPU 106 executes a periodic loop of taking a reading, calculating a coin count, and providing the coin count to various display or memory devices as needed. In a preferred embodiment, a latest reliable value for the coin count is retained and is not overwritten by any subsequent unreliable coin counts, thereby providing a reliable coin count value which can be polled at any time by asynchronous processes.

Figure 12:
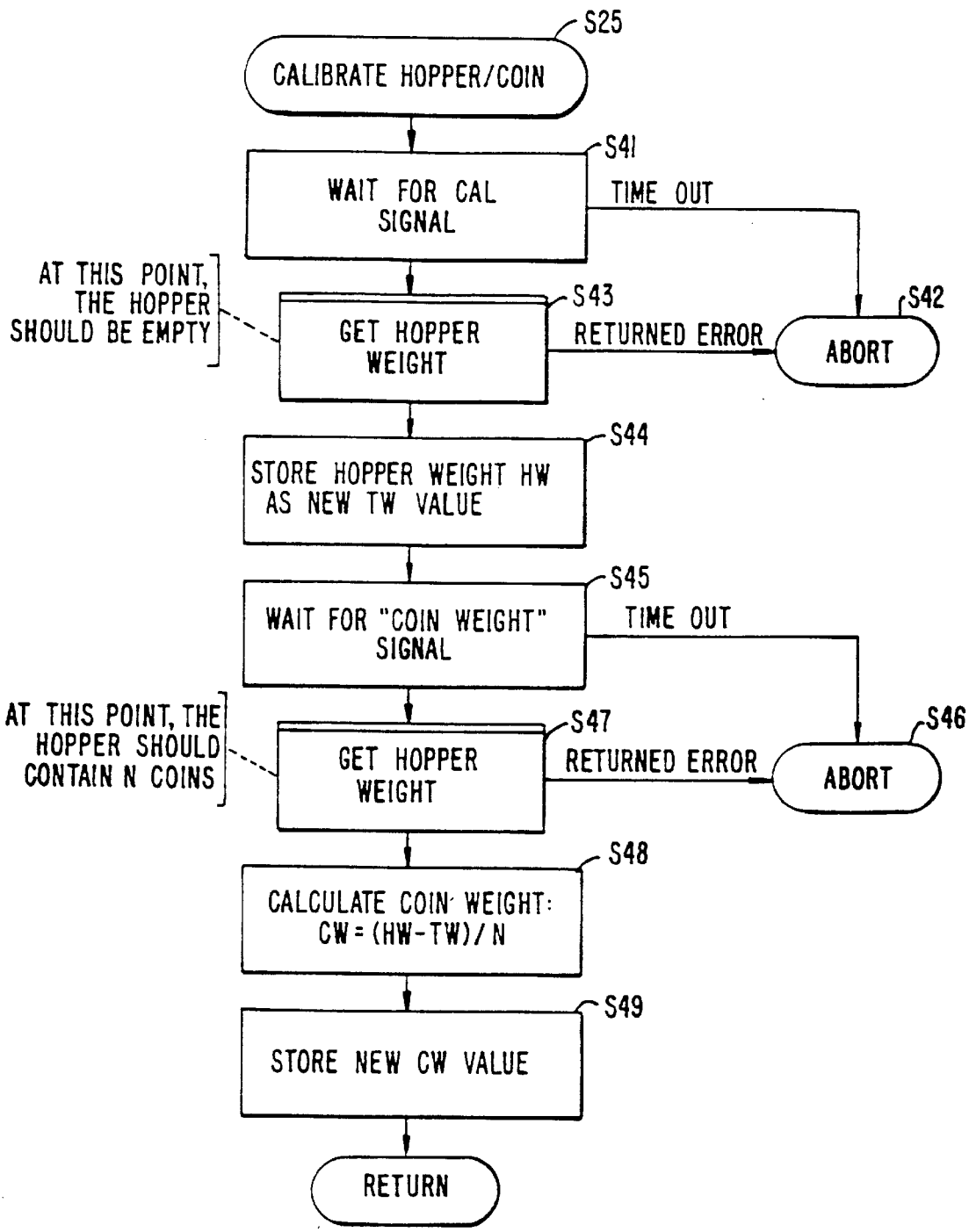
FIG. 12 is a flowchart of a process for calibrating a hopper's tare weight and a per coin weight.

FIG. 12 shows the calibration process of step S25 in further detail. At the outset of the calibration process, CPU 106 waits (S41) for a calibration signal, either from a remote device or from the operator pressing calibration switch 112. If the calibration signal is not received within a predetermined time, the calibration process is aborted and an indication that calibration did not complete is given so that readings (see FIG. 11) will not be taken until the calibration process actually successfully completes. If the calibration signal is received, CPU 106 proceeds to obtain the hopper weight (S43), which is described in further detail in FIG. 13 Prior to receipt of the calibration signal, the hopper should have been emptied by the operator so that a tare weight of the hopper can be obtained. Also, if the calibration signal is sent using calibration switch 112, CPU 106 delays for a predetermined time to allow for dampening of slot machine vibrations due to calibration switch 112 being pressed. If the hopper weighing process returns an error indicating that a reliable hopper weight cannot be obtained, CPU 106 aborts the calibration process (S42). However, if a reliable hopper weight is obtained, that hopper weight is stored as the new tare weight (TW) value for the hopper (S44).

Once the hopper tare weight is obtained, CPU 106 waits for a COIN WEIGHT signal (S45), and when the COIN WEIGHT signal is received, CPU 106 again measures the hopper weight (S47). Before the COIN WEIGHT signal is sent, the process expects that the hopper now contains N coins. In a preferred embodiment, N=20, however it should be apparent that other values of N could be used. If a time out occurs while waiting for the COIN WEIGHT signal or the hopper weighing process returns an error, the calibration process is aborted (S46) and only the tare weight is updated. Where a hopper is modified or moved to a different slot machine, the calibration procedure could be allowed to abort at step S46, without ill effects, since the prior per coin weight can be reused.

Once the hopper weight is obtained (S47) for the hopper and the N coins, a coin weight is calculated (S48) by subtracting the hopper tare weight (TW) from the just measured hopper weight (HW) and dividing the difference by N. This new per coin weight (CW) is then stored (S49) in variable memory 110, preferably compared with a known per coin weight, and, if the measured per coin weight favorably compares with the known per coin weight, the calibration process returns indicating a successful hopper calibration.

Figure 13:
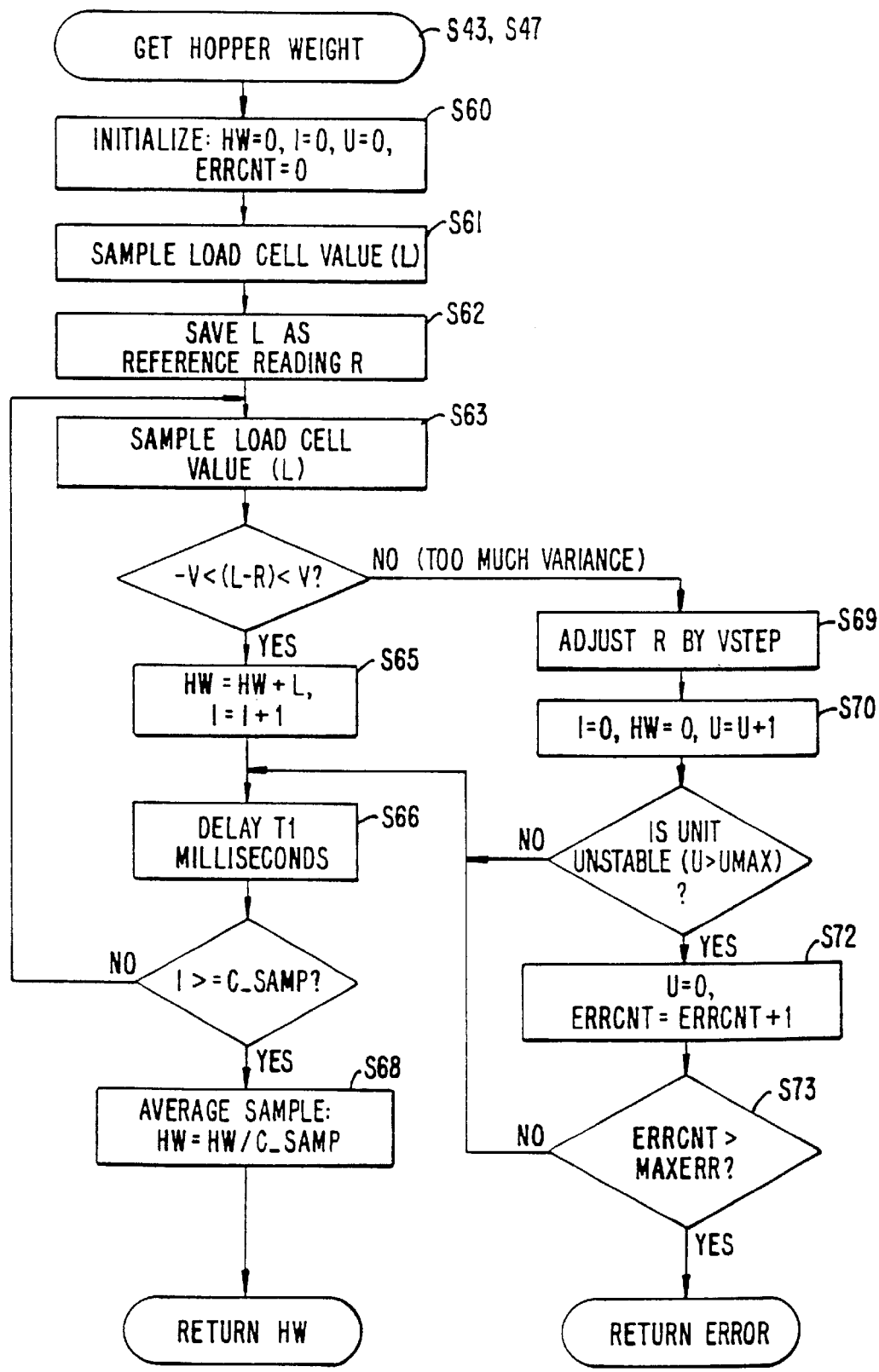
FIG. 13 is a flowchart of a process for obtaining an accurate hopper weight during calibration in the presence of noise and/or vibrations.

FIG. 13 shows the process of getting a hopper weight, the result being either returning successfully with a hopper weight (HW) or returning an error indicating that the hopper was too unstable for a measurement to have been taken.

At the beginning of the process, the variables used for temporary storage and loop control are initialized (S60) and a sampled digital value, L, is taken from load cell 13 (S61).

As should be apparent from this description, the processes of FIGS. 10–14 are equally applicable to coin accounting using a drop box, with the main difference being that load cell 13($a$) is sampled instead of load cell 13. The sampled value L is stored as a reference reading R (S62), and a main loop is entered.

In the main loop, the load cell is again sampled (S63) to obtain a new value for L. If the absolute value of the difference between L and the reference reading R is less than a variance limit, V, then the sampled value L is added to an accumulator (HW) and a loop counter (I) is incremented (S65). CPU 106 then pauses for a predetermined delay period of T1 milliseconds (S66) and then loops back to step S63 to take another reading. This continues until a predetermined number, C_SAMP, of readings has been taken. Once C_SAMP readings have been taken and accumulated, the value in the accumulator (HW) is divided by C_SAMP (S68), to yield a hopper weight. In a preferred embodiment, the digital values L and R are integers ranging from zero to 16,383, the variance threshold V is 120, T1 is 100 milliseconds and C_SAMP=40.

If the absolute value of the difference between L and R is greater than or equal to V, indicating too much variance between a sampled weight and a reference weight, the reference weight is adjusted by an increment VSTEP (S69). More specifically, R is adjusted so that the absolute value of the difference between L and R is reduced by VSTEP, i.e., if R is greater than L by more than V, R is reduced by VSTEP and if R is less than L by more than V, R is increased by VSTEP. In a preferred embodiment, VSTEP=10.

Following the adjustment of R, the loop counter (I) and the accumulator (HW) are zeroed. (S70) and an unstable reading counter, U, is incremented. If the unstable reading counter U is not greater than a maximum UMAX, then CPU 106 reenters the main loop just before step S66. Otherwise, if U is greater than UMAX, U is reset to zero and an error count (ERRCNT) is incremented (S72). If the error count is greater than a maximum error value (ERRCNT>MAXERR) (573), the hopper weight process ends and an error indication is returned. Otherwise, CPU 106 reenters the main loop just before step S66. In a preferred embodiment, UMAX=40 and MAXERR=4. Also, in a preferred embodiment, as instability is detected, the operator is provided with an indication, such as a display "UNST", to indicate that instability is being detected, thereby giving the operator the opportunity to eliminate the source of instability while a reading is being taken. Assuming a valid hopper weight reading is obtained, this can be used in the calibration process shown in FIG. 12.

Figure 14:
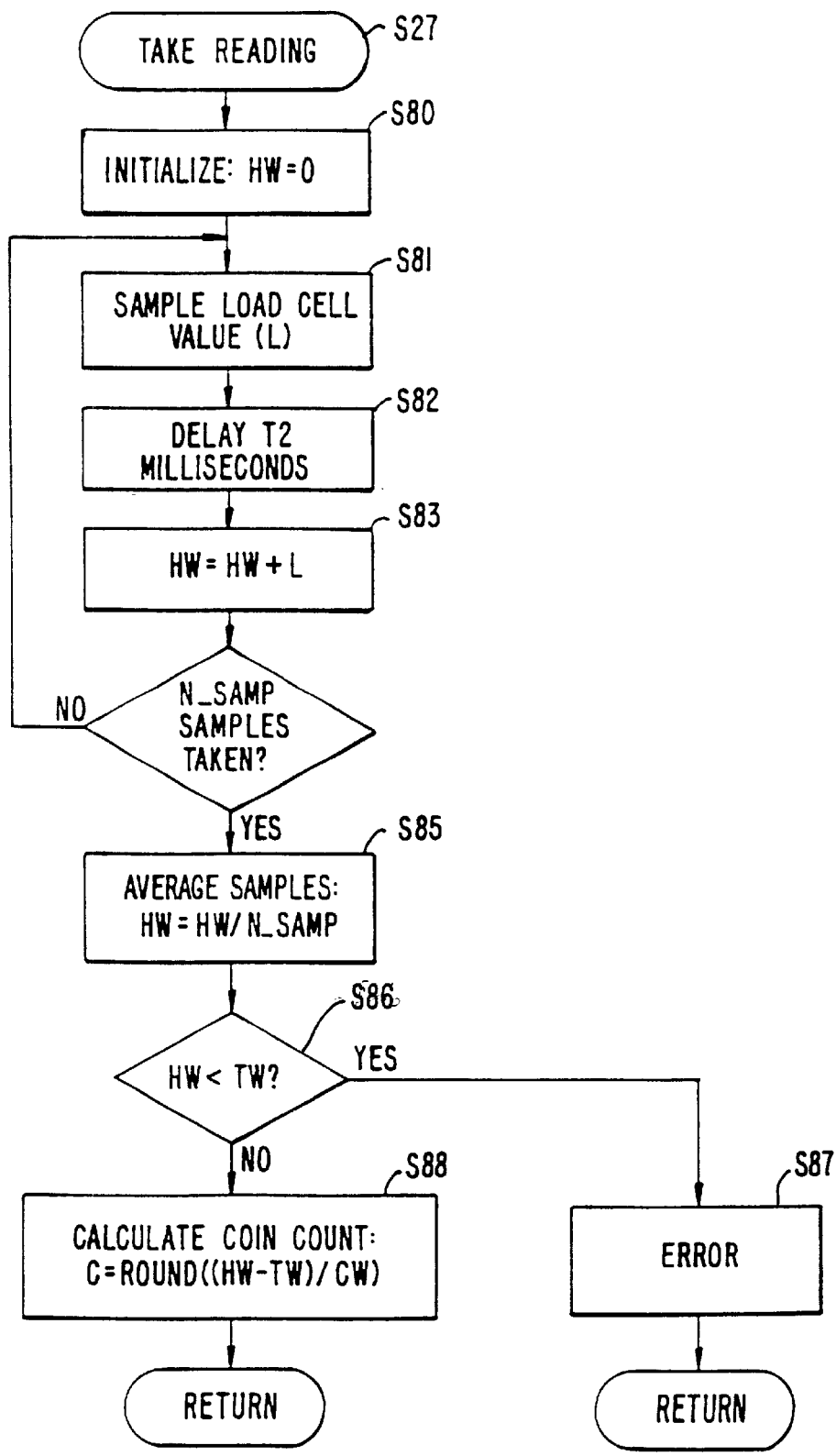
FIG. 14 is a flowchart of a process for obtaining an accurate coin count in the presence of noise and/or vibrations.

FIG. 14 shows the process of taking a reading, which results in either a coin count C being returned or an error indication being returned. At the outset of this process an accumulator (HW) and a loop counter (not shown) are initialized (S80). In the main loop (shown as steps S81, S82, S83) a load cell is sampled to obtain a value L, CPU 106 delays for T2 milliseconds, and the sampled value L is added to the accumulator (HW). This loop repeats until N_SAMP samples are taken. In a preferred embodiment, T2 is 200 milliseconds and N_SAMP=30.

Once N_SAMP samples are taken, the accumulator (HW) is divided by N_SAMP (S85) and the resultant hopper weight (HW) is compared to the hopper tare weight (S86). If the hopper weight HW is less than the tare weight TW, an error signal is generated (S87), otherwise a coin count C is calculated (588) according to the formula:

$$C = ROUND((HW-TW)/CW).$$

Of course, other suitable formula can be used. The hopper weight reading process of FIG. 14 is less interactive and less error-correcting than the hopper-weight reading process of FIG. 12, since the former generally occurs when the slot machine is not open and an unreliable reading can be discarded without ill effects, whereas the latter process provides tare weight and per coin weights which cannot be as easily discarded.

Thus, in the manner described above, a hopper is weighed periodically and that weight is used, combined with an automatically determined per coin weight, to determine a number of coins in the hopper. In one specific use of the coin count, coins are counted as the hopper door is opened and then counted again after the hopper door is closed and this difference is compared to an authorized difference to determine if unauthorized removal of coins from the hopper while the hopper door was open occurred. One application of this system includes a centralized slot machine control system, from where a trusted employee can monitor the opening and closing of each slot machine door, as well as a current inventory of the coins in the hopper and/or drop box of each slot machine. The necessary information can be communicated from the slot machines to the centralized slot machine control system through dedicated communication lines running from each slot machine or can be provided by the above described data pin system.

The description provided above is illustrative and not restrictive. Many variations of the invention will become apparent to those of skill in the art upon review of this disclosure. For example, it should be apparent after reading the above description that non-coin disks or tokens, or even bills or scrip could be accounted for as coins are, and that the present invention could be used with other gaming machines (e.g., amusement with payout machines), with vending machines or for other applications. As another example, a weighing apparatus of the present invention can be placed, with a suitable transmitter, at the bottom of all the mail boxes along a certain mail route. When mail is inserted into the mail box, its weight will be sensed by the weighing apparatus of the present invention and transmitted to a suitable receiver in, for example, a mail pickup vehicle. Through use of the weighing apparatus system of the present invention, the person in charge of picking up mail from various mail box locations would know instantaneously which mail box locations needed to be visited for collection and which mail boxes could be skipped. It should also be apparent that the data pin system described above can be replaced with a hard-wired slot machine communications network connection, wireless links, optical or RF communications links, or the like. Accordingly, the scope of the invention should, therefore, be determined not with reference to the above description, but instead should be determined with reference to the appended claims along with their full scope of equivalents.

What is claimed is:

1. A weighing apparatus for a coin receptacle in a gaming, amusement or vending machine comprising:
   an upper plate to support said coin receptacle;
   a lower plate;
   a load cell, incorporating a strain gauge, interposed between and attached to both said upper plate and said lower plate; and
   two guide rails on said upper plate to correctly position said coin receptacle.

2. The weighing apparatus of claim 1 further including spacers interposed between said load cell and each of said upper plate and said lower plate.

3. The weighing apparatus of claim 1 wherein said load cell is in the shape of a rectangular prism.

4. The weighing apparatus of claim 3 wherein diagonally opposite edges of said load cell are attached to said upper plate and said lower plate.

5. The weighing apparatus of claim 1 wherein said gaming, amusement or vending machine is a slot machine.

6. A weighing apparatus comprising:
   an upper plate having two elevated side sections and a recessed central section;
   a substantially flat lower plate; and
   two load cells, each of said load cells incorporating a strain gauge and being both interposed between and attached to said lower plate and one of said elevated side sections of said upper plate.

7. The weighing apparatus of claim 6 further comprising two guide rails on said upper plate to correctly position said coin receptacle.

8. The weighing apparatus of claim 6 further including spacers interposed between said load cell and each of said upper plate and said lower plate.

9. The weighing apparatus of claim 6 wherein each of said load cells is in the shape of a rectangular prism.

10. The weighing apparatus of claim 9 wherein diagonally opposite edges of each said load cell are attached to an elevated side section of said upper plate and to said lower plate.

11. The weighing apparatus of claim 6 further comprising an analog-to-digital converter connected to said strain gauge.

12. A weighing apparatus for a coin hopper assembly in a slot machine comprising:
   an upper plate having a recessed central section which supports said coin hopper assembly and having two elevated side sections;
   a substantially flat lower plate; and
   two load cells, each of said load cells incorporating a strain gauge and being both interposed between and attached to said lower plate and one of said elevated side sections of said upper plate.

13. The weighing apparatus of claim 12 further comprising two guide rails on said recessed central section of said upper plate to correctly position said coin hopper assembly.

14. The weighing apparatus of claim 12 further including spacers interposed between said load cell and both an said elevated side section of said upper plate and said lower plate.

15. An integrated coin hopper and coin weighing apparatus comprising:
   a coin hopper;
   a coin hopper base plate; and,
   a load cell, incorporating a strain gauge, interposed between and attached to said coin hopper and said hopper base plate.

16. The weighing apparatus of claim 15 further including spacers interposed between said load cell and each of said coin hopper and said coin hopper base plate.

17. The weighing apparatus of claim 15 wherein said load cell is in the shape of a rectangular prism.

18. The weighing apparatus of claim 17 wherein diagonally opposite edges of said load cell are attached to said upper plate and said lower plate.

19. The weighing apparatus of claim 15 wherein said integrated coin hopper and coin weighing apparatus resides in an amusement with payout machine.

20. A method of coin theft detection in a gaming machine, comprising the steps of:

a first weighing step of weighing coins in a coin hopper of said gaming machine using a weighing apparatus which is built into said coin hopper, thereby measuring a first weight;

a first calculating step of calculating a number of coins in the coin hopper based on the first weight, resulting in a first count;

allowing access to the coins in the coin hopper;

a second weighing step of weighing coins in a coin hopper of said gaming machine using a weighing apparatus which is built into said hopper, thereby measuring a second weight;

a second calculating step of calculating a number of coins in the coin hopper based on the second weight, resulting in a second count; and setting an alarm if the second count is less than the first count minus an authorized number of removed coins.

21. The method of claim 20, wherein the coins are tokens exchangeable for value.

22. The method of claim 20, wherein the first weighing step is performed at a time when the coin hopper is secure within the gaming machine and the second weighing step is performed at a time when the coin hopper is secure within said gaming machine, the method further comprising a step of detecting who has access to the coin hopper during a period in which the coin hopper is not secure between the time the first weighing step is performed and the second weighing step is performed.

23. The method of claim 22, wherein access to the coin hopper is limited by use of an electronic key for opening a door of said gaming machine, the method further comprising the step of reading the electronic key and recording an electronic key identifier.

24. The method of claim 20, further comprising the steps of:

dropping an overflow number of coins from the coin hopper into a drop box when a level of coins at or above a drop threshold is detected in the coin hopper;

weighing coins in the drop box, thereby determining a drop box coin weight;

calculating a number of coins in the drop box from the drop box coin weight, resulting in a drop box count; and adding the drop box count to the first or second count to determine a total coin count.

25. The method of claim 20, wherein the first and second steps of weighing coins are steps of weighing coins of known unit weight.

26. The method of claim 20, wherein the first and second steps of weighing coins are steps of weighing coins and the coin hopper.

27. The method of claim 20, wherein the steps of weighing coins comprise the substeps of:

measuring an acceleration of the coin hopper relative to the gaming machine; and measuring a distortion of a cantilever beam which is distorted by the weight of the coin hopper and the coins therein when the acceleration of the coin hopper relative to the gaming machine is essentially zero or is a known acceleration.

28. A method of securing a gaming machine from unauthorized removal of coins from a coin hopper in the gaming machine, comprising the steps of:

detecting a door being opened;

substantially simultaneously with the door being opened, measuring a first number of coins in the coin hopper by weight using a coin weighing apparatus which is built into said coin hopper;

detecting the door being closed;

measuring a second number of coins in the coin hopper by weight after the closing of the door is detected using a coin weighing apparatus which is built into said coin hopper; and determining a difference in coin count by subtracting the first count from the second count and electronically reporting the difference to a theft control system.

29. The method of claim 28, further comprising the step of adjusting the difference to account for authorized coin removals.

30. The method of claim 28, further comprising a step of setting an alarm when the difference is greater than zero.

31. The method of claim 30, wherein the step of setting an alarm is a step of setting a flag in a field of a row of a data table associated with the gaming machine in which the difference is detected.

32. A method of coin theft detection in a gaming machine, comprising the steps of:

weighing coins in a coin hopper of said gaming machine using a coin weighing apparatus which is built into said coin hopper to determine a baseline weight at the start of a detection period;

calculating a baseline coin count from the baseline weight;

recording a number of inserted coins;

recording a count for each authorized withdrawal of payout;

calculating an expected coin count by subtracting the count for each authorized withdrawal or payout from the baseline coin count and adding the number of inserted coins thereto;

weighing coins in the hopper at the end of the detection period to determine a final hopper weight using a coin weighing apparatus which is built into said coin hopper;

calculating a final coin count from the final hopper weight; and determining a discrepancy amount for the detection period by subtracting the final coin count from the expected coin count.

33. The method of claim 32, further comprising the step of reporting the discrepancy amount as a coin theft amount.

34. A method of coin theft detection in a gaming machine, comprising the steps of:

a first weighing step of weighing coins in a coin hopper of said gaming machine using a self-contained weighing apparatus which is separate from said coin hopper, thereby measuring a first weight;

a first calculating step of calculating a number of coins in the coin hopper based on the first weight, resulting in a first count;

allowing access to the coins in the coin hopper;

a second weighing step of weighing coins in a coin hopper of said gaming machine using a self-contained weighing apparatus which is separate from said hopper, thereby measuring a second weight;

a second calculating step of calculating a number of coins in the coin hopper based on the second weight, resulting in a second count; and setting an alarm if the second count is less than the first count minus an authorized number of removed coins.

35. A method of detecting coin theft from a fill bag in a gaming, amusement or vending machine, comprising the steps of:

a first weighing step of weighing coins in a fill bag in said machine, a first calculating step of calculating a number of coins in said fill bag based on the first weight, resulting in a first count;

allowing access to said frill bag;

a second weighing step of weighing coins in said fill bag after allowing access, thereby measuring a second weight;

a second calculating step of calculating a number of coins in said fill bag based on the second weight, resulting in a second count; and setting an alarm if the second count is less than the first count minus an authorized number of removed coins.

36. A method of detecting insertion of counterfeit coins into a coin hopper of a gaming, amusement or vending machine, comprising the steps of:

ascertaining the weight of a valid coin;

sensing the number of coins inserted into said machine;

weighing the total number of coins collected in said coin hopper of said machine;

dividing the weight of coins collected in said coin hopper by the number of coins sensed to determine the average weight of coins in said coin hopper;

comparing the average weight of coins in said coin hopper to the weight of a valid coin to ascertain whether counterfeit coins are being inserted into said coin hopper.

37. A weighing apparatus for a coin receptacle in a gaming, amusement or vending machine comprising:

an upper plate to support said coin receptacle;

a lower plate; and a load cell, incorporating a strain gauge, interposed between and attached to both said upper plate and said lower plate;

wherein said load cell is in the shape of a rectangular prism.

38. A weighing apparatus for a coin receptacle in a gaming, amusement or vending machine comprising:

an upper plate to support said coin receptacle;

a lower plate; and a load cell, incorporating a strain gauge, interposed between and attached to both said upper plate and said lower plate;

wherein said gaming, amusement or vending machine is a slot machine.

* * * * *